United States Patent
Hallam et al.

(10) Patent No.: US 12,474,212 B2
(45) Date of Patent: Nov. 18, 2025

(54) DEVICE AND SYSTEM FOR MEASURING A TEMPERATURE OF A MOLTEN METAL

(71) Applicant: Heraeus Electro-Nite International N.V., Houthalen (BE)

(72) Inventors: Christopher Hallam, Chesterfield (GB); Mark Lee, Chesterfield (GB); Ross Prodger, Chesterfield (GB); Paul A. Turner, Hartland, WI (US)

(73) Assignee: HERAEUS ELECTRO-NITE INTERNATIONAL N.V., Houthalen (BE)

( * ) Notice: Subject to any disclaimer, the term of this patent is extended or adjusted under 35 U.S.C. 154(b) by 428 days.

(21) Appl. No.: 18/041,608

(22) PCT Filed: Jul. 5, 2021

(86) PCT No.: PCT/EP2021/068543
§ 371 (c)(1),
(2) Date: Feb. 14, 2023

(87) PCT Pub. No.: WO2022/037839
PCT Pub. Date: Feb. 24, 2022

(65) Prior Publication Data
US 2023/0349767 A1 Nov. 2, 2023

Related U.S. Application Data

(60) Provisional application No. 63/068,270, filed on Aug. 20, 2020.

(51) Int. Cl.
*C21C 5/52* (2006.01)
*G01J 5/00* (2022.01)
(Continued)

(52) U.S. Cl.
CPC .......... *G01J 5/004* (2013.01); *G01J 5/0205* (2013.01); *G01J 5/0821* (2013.01); *B22D 2/006* (2013.01);
(Continued)

(58) Field of Classification Search
CPC ........ G01J 5/004; G01J 5/0205; G01J 5/0821; G01J 5/084; G01J 5/026; G01J 5/048;
(Continued)

(56) References Cited

U.S. PATENT DOCUMENTS 4,602,121 A 7/1986 Priaroggia
7,748,896 B2 7/2010 Dams et al.
(Continued)

FOREIGN PATENT DOCUMENTS

EP 3156834 A2 4/2017
EP 3156835 A1 4/2017
(Continued)

OTHER PUBLICATIONS

"All About 304 Stainless Steel (Properties, Strength, and Uses)" by Christian Cavallo at <https://www.thomasnet.com/articles/metals-metal-products/all-about-304-steel-properties-strength-and-uses/> (c) Dec. 7, 2023.*
(Continued)

*Primary Examiner* — Randy W Gibson
(74) *Attorney, Agent, or Firm* — Blank Rome LLP

(57) ABSTRACT

The invention relates to a device and method for measuring a temperature of a molten metal bath. The device according to the present invention comprises a cored wire and a detector. The cored wire comprises an optical fiber, a first metal tube, a filler layer of an organic material and a second metal tube accommodating the filler layer.

20 Claims, 3 Drawing Sheets

(51) Int. Cl.
*G01J 5/02* (2022.01)
*G01J 5/0821* (2022.01)
*B22D 2/00* (2006.01)
*G01K 13/02* (2021.01)

(52) U.S. Cl.
CPC ........ *C21C 5/52* (2013.01); *C21C 2005/5288* (2013.01); *G01K 13/026* (2021.01)

(58) Field of Classification Search
CPC ....... G01J 11/32; B22D 2/006; G01K 13/026; C21C 5/52; C21C 2005/5288
See application file for complete search history.

(56) References Cited

U.S. PATENT DOCUMENTS

| | | | |
|---|---|---|---|
| 10,024,732 B2* | 7/2018 | Neyens | B65H 57/12 |
| 11,440,081 B2* | 9/2022 | Kendall | F27D 3/0026 |
| 11,959,813 B2* | 4/2024 | Neyens | B22D 2/006 |
| 2002/0025434 A1 | 2/2002 | Riche et al. | |
| 2007/0267477 A1 | 11/2007 | Schott et al. | |
| 2007/0268477 A1 | 11/2007 | Dams et al. | |
| 2021/0396602 A1* | 12/2021 | Neyens | G01J 5/0821 |
| 2024/0003758 A1* | 1/2024 | Van Vlierberghe | G01K 11/32 |
| 2024/0027272 A1* | 1/2024 | Van Vlierberghe | G01J 5/084 |
| 2024/0027273 A1* | 1/2024 | Van Vlierberghe | G01J 5/084 |

FOREIGN PATENT DOCUMENTS

| | | |
|---|---|---|
| EP | 3290881 A1 | 3/2018 |
| GB | 2543319 A | 4/2017 |
| GB | 2558223 A | 7/2018 |
| JP | H1021762 A | 1/1998 |
| JP | H10 176954 A | 6/1998 |
| WO | 2005090959 A1 | 9/2005 |

OTHER PUBLICATIONS

Computer translation of H10-176954 downloaded from the JPO website on Jun. 18, 2025.*

* cited by examiner

DEVICE AND SYSTEM FOR MEASURING A TEMPERATURE OF A MOLTEN METAL

The invention relates to a device and a system for measuring a temperature of a molten metal bath.

There are several means and methods available for measuring the temperature of a molten metal bath in a metallurgical vessel during the metal making process. One of these means for measuring the temperature of the molten metal bath, particularly of iron or steel in a melting environment of an electric arc furnace (EAF), involves immersing an optical fiber surrounded by a metal tube into the molten metal. An optical fiber surrounded by a metal tube is often also referred to as cored wire. The optical fiber can receive thermal radiation and can convey the thermal radiation from the molten metal to a detector, e.g. a pyrometer. Suitable instrumentation can be associated with the detector for determining the temperature of the molten metal bath.

For measuring the temperature of the molten metal bath, the cored wire can be fed into the molten metal bath where it may be consumed over a predetermined time interval. The leading tip of the optical cored wire is immersed into the metallurgical vessel, encountering on its way towards the molten metal bath first a hot atmosphere, followed by a slag layer and then the molten metal bath. Depending on the state of the melting process, the bath may also contain remaining unmolten parts, deriving for example from scrap. The immersed part of the cored wire will melt in the molten metal bath. Once the temperature measurement has been concluded, the tip of the optical cored wire can be partly retracted from the molten metal bath. The tip of the retracted optical cored wire is then the new leading tip for the next temperature measurement. Such a device is therefore suitable for semi-continuous temperature measurements in form of a series of immersion cycles.

It has generally been found that the availability of an unvitrified optical fiber is essential for an accurate temperature measurement. Especially the condition of the leading tip is crucial.

Many of the devices known in the prior art are commonly constructed by using an optical fiber located in a tube. The gap between the optical wire and the metal tube is commonly filled with a filler material to protect the optical fiber from the heat of the molten metal bath during the immersion. The layered structure aids in keeping the optical fiber at a low temperature for a relatively long time. Devitrification from elevated temperatures that will destroy the optical fiber is delayed.

U.S. Pat. No. 7,748,896B2 discloses a device comprising an optical fiber with a laterally surrounding cover, wherein the cover surrounds the optical fiber in a plurality of layers, one layer comprising a metal tube and an intermediate layer formed from an inorganic material arranged beneath the metal tube. During the immersion of this tube in a liquid metal bath, the outer tube will melt and the loosely held filler will tend to float to the surface, exposing the centrally arranged optical fiber to the liquid metal bath.

Furthermore, consumable optical fibers have been proposed which comprise additional protection structures. For example, JPH10176954A describes a fiber which is surrounded with a spacing by a metal tube. Arranged around this metal tube is a tube made of an insulating coating which in turn is surrounded by an outer metal tube. This structure prevents the inner metal tube from melting too quickly. The coating made of the insulating material may contain carbon particles, so the inner metal tube does not melt until the corresponding tube portion is immersed in the molten metal bath.

While the devices proposed in the prior art help to isolate the optical fiber from the harsh conditions prior to a measurement, the devices may suffer from an uncontrolled decomposition of the insulation coating under certain conditions.

It is well known in the art of accurate temperature measurements by an immersed optical fiber that the optical fiber must be consumed at a rate which is equal to or faster than the rate of devitrification of the optical core. The rate of devitrification is a function of the amount of heat input to the optical core during its molten metal immersion and heat input to the optical core from exposure to the environment surrounding. Therefore, the cored optical fiber must be allowed to be consumed in proportion to pre-exposure conditions such as the radiant heat at the immersion location, the slag temperature as well as the melt temperature of the particular furnace.

In every case, a length of the cored wire has already been in the furnace during the previous measurement. Because of the continuous property of the optical cored wired, the adjacent unused portion of optical cored wire may be thermally changed due to high temperatures either by radiant heat from the furnace interior, convection heating from evolved gases of the steelmaking process or conduction from temporary contact with the molten slag cover and/or heat transfer along the continuous metal covers from the hot to cold sections of the optical cored wire coil. Cutting away the unused but damaged portion was a solution for example taught by JPH10176954A. Such a mechanical additional process step creates an additional demand on the measurement equipment and the consumption of the cored wire is significantly increased.

In EP3156835A1 and EP3156834A2 further improvements to cored wires are disclosed. An intermediate layer, comprising a low-density refractory material which melts in a controlled way upon exposure to a molten metal bath is used to protect the optical fiber long enough to avoid devitrification prior to obtaining the temperature measurement. The material of the intermediate layer forms a gob which floats towards the surface of the molten metal bath. While the proposed devices provide a solution for a more controlled decomposition of the intermediate layer, they may suffer from an increased response time which may be problematic for certain application scenarios.

As set forth above, constructions known from the prior art may not offer accurate measurements with the required quality in the required response time over the entire application range. The term application range refers to the temperature range in which temperature measurements of the molten metal bath are conducted. It also refers to consecutive multiple measurements, in which a cored wire may have been objected to different influences by the application environment.

The object of the invention is to provide an improved device and system for measuring a temperature of a molten metal bath which solves at least one of the problems discussed above. Specifically, one of the objects is to provide an improved device to obtain more reliable temperature measurements over a broad application range. Even more specifically, the object is to improve the melting and decomposition behavior of the device during and after measurement. Another object is to provide a device, which allows to minimize the consumption of cored wire.

These objects are attained by a device and a system for measuring a temperature of a molten metal bath according to the independent claims. Preferred embodiments are defined in the dependent claims.

The device according to the present invention comprises
(a) a cored wire having an immersion end and an opposite end, the cored wire comprising
  (a1) an optical fiber,
  (a2) a first metal tube accommodating the optical fiber,
  (a3) a filler layer surrounding the first metal tube and
  (a4) a second metal tube accommodating the filler layer, and
(b) a detector to receive a signal transmitted by the optical fiber, the detector being coupled to the opposite end of the cored wire, wherein the first metal tube has a yield force of at least 140 N, and wherein the filler layer has a density in the range of 0.3-1.1 g/cm$^3$ and comprises a filler layer material which is an organic material having an ash content of not more than 10 mass-%.

Surprisingly, it has been found that the problems arising in the prior art can be overcome by selecting the properties of the first metal tube and the filler layer appropriately. Specifically, it has been found that by using a first metal tube having a yield force of at least 140 N and a filler layer having a density in the range of 0.3-1.1 g/cm$^3$, a more controllable exposure of the optical fiber to the bath can be obtained which improves the obtainable measurement quality.

The invention provides a device for measuring a temperature of a molten metal bath. As used herein, the term bath is used to describe a melt in a vessel, wherein certain physical parameters of the melt are supposed to be determined. The molten metal of the molten metal bath is not particularly restricted. According to a preferred embodiment, the molten metal is molten steel. The term molten metal bath does not exclude the presence of any solid or gaseous parts.

The temperature of metal melts may differ and usually depends on the composition of the metal and the stage of the melting process. Typically, the temperature of a molten metal bath is between 1500 and 1700° C.

The invention comprises a cored wire. Here, the term "cored wire" can be used to refer to an optical fiber comprised in a casing, in particular a metal tube. The casing can fully encircle the optical fiber or can be at least partially open so that the casing is not fully encircling the optical fiber.

The cored wire according to the invention has an immersion end and an opposite end. The immersion end of the cored wire is to be understood as the part of the device that is configured to be dipped in application with the leading tip in the molten metal bath. According to a preferred embodiment, the cored wire is a consumable cored wire. Preferably, when used for measuring a temperature, the cored wire is consumed in the direction from the immersion end towards the opposite end and after each measuring sequence, another part of the device will be the immersion end. The opposite end is connected to the detector and will not be consumed during a measurement.

The cored wire comprises an optical fiber. An optical fiber is a flexible, transparent fiber. Optical fibers are used most often as a means to transmit light between the two ends of the fiber. An optical fiber maybe formed from glass or plastic, preferably quartz glass. Most commonly graded index fibers are used for the intended applications.

According to a preferred embodiment, the device may comprise a single optical fiber.

In a further embodiment, the device may comprise a plurality of optical fibers.

The optical fiber is accommodated by a first metal tube.

While immersed, the cored wire is objected to buoyant forces acting against the immersed device by the molten metal. For a reliable measurement, it is crucial that the optical fiber is immersed to a certain depth into the molten metal bath when the measurement is performed. The first metal tube has to resist these bending forces, keeping the optical core submerged in the immersion direction until it invariably dissolves, which demands a certain mechanical rigidity of the first metal tube.

According to the invention, the yield force of the first metal tube is at least 140 N.

The first metal tube may be defined by a first tube wall thickness (T1), an outer diameter (D1), an inner diameter (I1), a cross-sectional area defined by the thickness of the walls of the first metal tube (CW1), a total cross-sectional area defined by the outer diameter (TC1) and an inner cross-sectional area defined by the inner diameter (IC1).

The yield force in the context of the present invention is defined as the product of the yield stress of the first metal tube and the cross-sectional area of the first metal tube (CW1).

For common materials, yield stress values are known in the art. For example, the yield stress of stainless steel SS304 can be found to be 195 MPa.

The first metal tube may have a wall thickness (T1) of 0.15-0.3 mm, preferably 0.2-0.25 mm.

The first metal tube may be formed from a sheet of metal. In a preferred embodiment, the metal may be iron or a steel, preferably a stainless steel.

In a preferred embodiment, the metal of the first tube may have a melting point in the range of 1400-1500° C., even more preferably in the range of 1430-1480° C.

In a preferred embodiment the linear density of the first metal tube may be 5-12 g/m, even more preferably in the range of 8-10 g/m. The linear density of a device is defined by its mass per unit length.

The first metal tube may have an outer diameter (D1) in the range of 1.5-2.5 mm. According to a further preferred embodiment the first metal tube may have an inner diameter (I1) in the range of 1.2-2.2 mm.

According to a preferred embodiment, the first metal tube wall thickness (T1) is smaller than 15% of the first metal tube outer diameter (D1).

In a further preferred embodiment, the cross-sectional area defined by the thickness of the walls of the first metal tube (CW1) is less than 45% the total cross-sectional area of the first metal tube (TC1).

Preferably, the inner cross-sectional area defined by the inner diameter of the first metal tube (IC1) is in the range of 1.4-3.5 mm$^2$.

In a preferred embodiment, the cross-sectional area of the optical fiber may cover the total cross-sectional area defined by the outer diameter of the first metal tube (TC1) by not more than 4%

The first metal tube of the cored wire according to the invention is surrounded by a filler layer.

In a preferred embodiment, the filler layer may comprise a plurality of pieces, more preferably the filler layer may comprise fibers.

In a preferred embodiment, the fibers of the filler layer may form a rope. It has been found that a rope formed of multiple groupings of fibers can be advantageous because it ensures that the fibers cannot discharge from an opened end of the cored wire in advance at the time that the cored wire is fed into the melt. A rope in the context of the present invention is a group of fibers, which are twisted or braided together in order to combine them into a larger and stronger form.

In further embodiments, the filler layer material may have the form of web, a net, a woven or knitted structure.

In another preferred embodiment, the filler layer can be formed of at least two sub-layers.

According to a preferred embodiment, the filler layer may comprise an adhesive or resin, or may be free of adhesive or resin. Preferably, the amount of adhesive or resin is less than 2 mass-% based on the total mass of the filler layer.

According to the invention, the filler layer comprises an organic material.

An organic material in the context of the present invention is to be understood as a material which contains carbon (C) at elementary level to an extend of at least 30% by mass. For example, the sum formula of the basic unit of chitin is $C_8H_{13}NO_5$ with a molar mass of 203.2 g/mol, resulting in a carbon content of 47.3% by mass.

Preferably, the organic material may be selected from the group consisting of naturally derived materials, natural or synthetic polymers and combinations thereof. More preferably, the organic material may be a polysaccharide, most preferably selected from the group consisting of lignin, chitin, cellulose and combinations thereof. Even more preferably, the organic material may be selected from the group consisting of cotton, wool, jute, hemp, coir, sisal, wood, flax and combinations thereof.

In a preferred embodiment, the filler layer comprises at least two filler layer materials.

In a further embodiment, one of the at least two materials of the filler layer may be a flame retardant. Such a material combination may aid in the control of the decomposition behavior of the filler layer.

The organic material has an ash content of not more than 10 mass-%, preferably not more than 8 mass-%, even more preferably not more than 6 mass-%.

The ash content represents the incombustible component of a material remaining after the material has been completely burned. An organic material may have an ash content of less than 100%. In contrast, an inorganic material, for example a glass, can have an incombustible content of up to 100%. The ash content of a material is determined by a thermogravimetric analysis according to ASTM 1131 in the presently valid version.

Organic materials with a low ash content according to the present invention have been found to be non-slag-forming combustible materials. Non-slag forming is to be understood that the material is not molten or substantially dissolved in the molten metal bath and does not remain in the slag layer typically covering the molten metal bath. In contrast, inorganic materials tend to melt, remain around the optical core for a prolonged duration and finally contribute to the slag layer covering the molten metal bath.

However, it has been found that such organic materials may not cease burning after the device has been in contact with the molten metal bath after a measurement cycle. A device which has been subjected to such a prolonged degradation of the filler layer is not suitable to obtain accurate temperature measurements in consecutive measurement cycles, since the optical fiber with the new leading tip is left unprotected and prone to devitrification. The damaged part has to be removed resulting in an increased consumption of the device.

Surprisingly it has been found that the density of the filler layer material may influence this disadvantageous degradation behavior.

According to the invention, the filler layer has a density in the range of 0.3-1.1 $g/cm^3$, preferably in the range of 0.4-1.0 $g/cm^3$, even more preferably in the range of 0.4-0.8 $g/cm^3$.

The density of the filler layer is to be understood as the density of the filler layer material when arranged in the cored wire occupying the volume between the first metal tube and the second metal tube. The density of the filler layer may generally differ from the density of the filler layer material prior to the application in the cored wire. The density of the filler layer may be achieved by compressing the filler layer material between the first and the second metal tube. Preferably, the density of the filler layer is higher than the density of the filler layer material prior to its application.

A material may be characterized by its maximum density, which is the highest density which can be attained when the material is compacted as far as possible.

In a preferred embodiment, the maximum density of the filler layer material is 0.5-3 $g/cm^3$, even more preferably 1.0-2.0 $g/cm^3$.

It may be advantageous that the layer density of the filler layer is not more than 50% of the maximum density of the filler layer material, even more preferably not more than 40%, most preferably not more than 30%. It may be advantageous, that the layer density of the filler layer is more than 10% of the maximum density of the filler layer material, even more preferably more than 20%. It may be preferred that the density of the filler layer is in the range of 10-50% of the maximum density of the filler layer material, more preferably in the range of 20-40%.

Advantageously, the first metal tube and the filler layer are in direct contact, i.e. without an additional layer or gap.

In a preferred embodiment, the thickness of the filler layer is higher than the wall thickness (T1) of the first metal tube.

According to the invention, a second metal tube accommodates the filler layer.

During a typical measurement sequence, the cored wire arrives in the molten metal bath at a certain point. When immersed, the second metal tube will melt and dissolve into the metal bath. The filler layer will insulate the first metal tube and the optical fiber from immediate heating. Upon contact with the molten metal, the filler layer will decompose exposing the first metal tube. While the first metal tube melts, the optical fiber is directly exposed to the molten metal bath and a temperature measurement may be conducted.

The second metal tube may be defined by a second tube wall thickness (T2), an outer diameter (D2), an inner diameter (I2), a cross-sectional area defined by the thickness of the walls of the second metal tube (CW2), a total cross-sectional area defined by the outer diameter (TC2) and an inner cross-sectional area defined by the inner diameter (IC2)

The second metal tube may have a wall thickness (T2) of 0.5-1.0 mm, preferably 0.7-0.9 mm.

The second metal tube may be formed from a sheet of metal. In a preferred embodiment, the metal may be a steel with a iron (Fe) content greater than 50%, preferably a low carbon (C) steel or stainless steel.

In a further preferred embodiment, the metal of the second metal tube may have a melting point of 1450-1550° C., even more preferably in the range of 1480-1520° C.

In a further preferred embodiment, the linear density of the second metal tube may be in the range of 200-300 g/m, even more preferably in the range of 220-260 g/m.

In a preferred embodiment, the edges of the sheet of the second metal tube in lateral direction may not form an overlap portion. The lateral direction is defined by the axis from the immersion end towards the opposite end of the device.

In a further preferred embodiment, the edges of the sheet of the second metal tube in lateral direction may overlap and build a seam portion. Even more preferably, the seam portion may be mechanically formed, most preferably the seam portion may not be sealed by adhesive, glues or welding.

The second metal tube may have an outer diameter (D2) in the range of 9-14 mm. According to a further preferred embodiment the second metal tube has an inner diameter (I2) in the range of 8-13 mm.

Advantageously, the second metal tube may be gas permeable. Such a design will enable gas in the internal structure of the cored wire to move away from inside the metal tube. During the decomposition of the filling layer, gas may be generated which may escape. A gas permeable design also allows gas from the environment to enter the cored wire, for example oxygen contained in the surrounding air.

In a preferred embodiment, the optical fiber is centrally arranged in the cored wire which further improves the quality and the reliability of the measurement results.

In a preferred embodiment, the filler layer may fill the space between the first metal tube and the second metal tube homogeneously.

Advantageously, the optical fiber is thermally isolated uniformly in lateral direction.

Furthermore, is has been found that in a preferred embodiment the first metal tube is concentrically arranged in the second metal tube. Preferably, the second metal tube is not in direct contact with the first metal tube.

It may be advantageous, that the melting point of the metal of the second metal tube is higher than the melting point of the metal of the first metal tube. In a preferred embodiment, the melting point of the metal of the second metal tube is at least 20° C. higher than the melting point of the metal of the first metal tube, more preferably more than 40° C. higher, most preferably more than 60° C. higher.

In a preferred embodiment, the outer diameter of the first metal tube (D1) is not larger than 30% of the outer diameter of the second metal tube (D2), more preferably not more than %.

Furthermore, it may be preferred that the outer diameter of the first metal tube (D1) is in the range of 10-30% of the outer diameter of the second metal tube (D2), even more preferably in the range of 15-25%.

It has been found that it may be advantageous that the linear density of the first metal tube is less than 10% of the linear density of the second metal tube.

In an embodiment, the thickness of the filler layer may be higher than the wall thickness of the first metal tube (T1). In a further embodiment, the thickness of the filler layer may be higher than the wall thickness of the second metal tube (T2).

In a preferred embodiment, the thickness of the filler layer is higher than the thickness of the layer formed by the first metal tube and the thickness of the layer formed by the second metal tube.

According to a further embodiment, the device may comprise a plurality of optical fibers, and each of the fibers may be surrounded by the first metal tube. According to another preferred embodiment, a plurality of optical fiber each surrounded by a separate first metal tube are arranged in the second metal tube.

According to the invention, the device comprises a detector to receive a signal transmitted by the optical fiber, the detector being coupled to the opposite end of the cored wire.

A detector in the context of the present invention may be a pyrometer.

The invention also relates to a system, comprising a device as described herein; and feeding means for feeding a leading tip of the device in a molten metal bath. The leading tip of the device in the terms of the present invention may be understood as the tip of the immersion end of the device.

In the context of the present invention, feeding means may be understood as means which allow the feeding of the cored wire into the molten metal bath. Such means may be selected from the group consisting of a coil, a feeder, a straightener, a guiding tube and a blowing lance.

The system may further comprise a furnace having an entry point for the device and holding the molten metal bath.

The idea underlying the invention shall subsequently be described in more detail with respect to the embodiments shown in the figures. For the purpose of illustrating the invention, there are shown in the drawings embodiments which are presently preferred. It should be understood, however, that the invention is not limited to the precise arrangements and instrumentalities shown. Herein:

Figure 1:
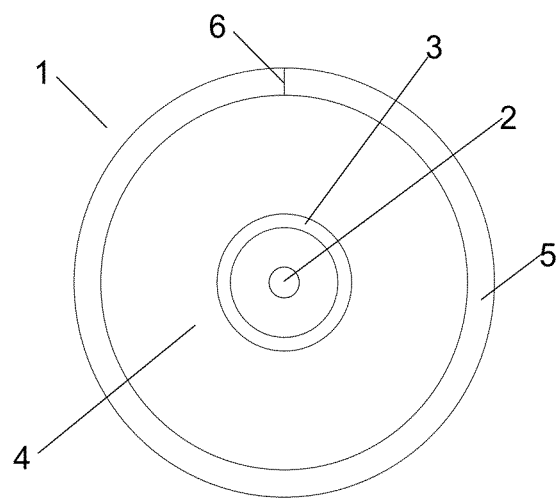
FIG. 1 shows a schematic cross-sectional view of a cored wire.

FIG. 1 shows a schematic view of a cored wire 1 in cross-sectional view, comprising an outer metal tube 5 (the second metal tube), a filler layer 4, and an inner metal tube 3 (the first metal tube) accommodating an optical fiber 2.

In the shown embodiment, the outer metal tube comprises a vent 6 which allows a gas-permeable construction.

FIGS. 2A-E show schematic views of cored wires 1'-1'''' according to several embodiments of the invention. It should be understood that combinations of the illustrated embodiments may also be possible according to the invention.

Figure 2:
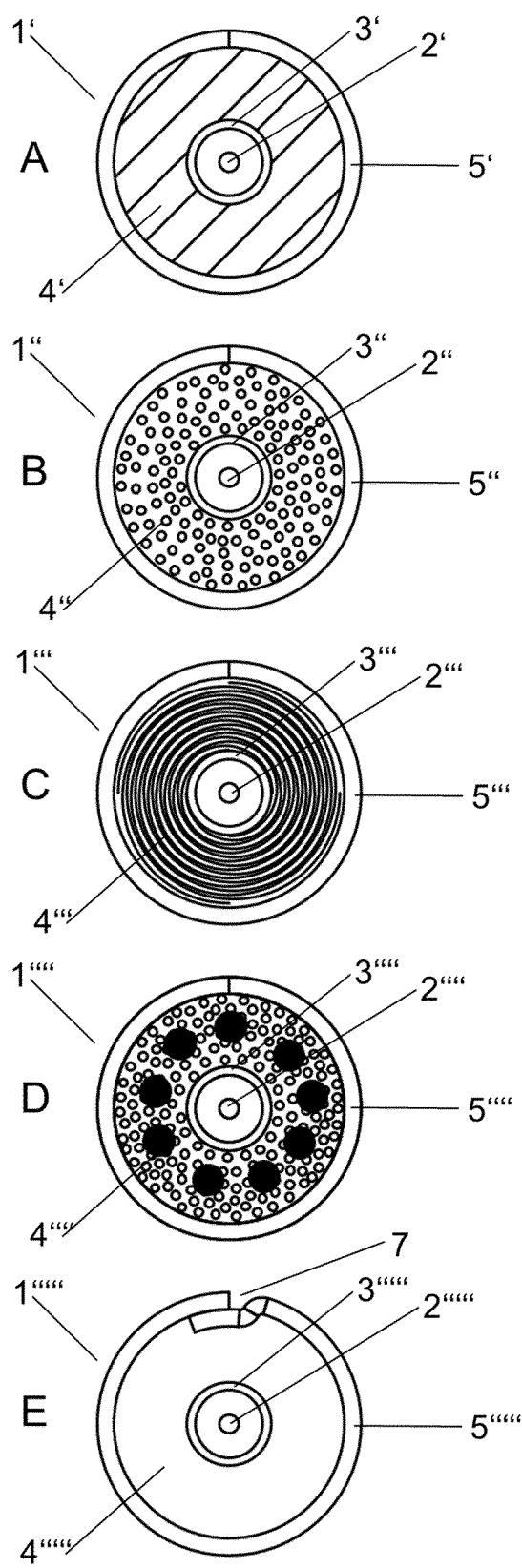
FIG. 2 shows schematic views of cored wires according to different embodiments of the invention.

FIG. 2A shows a cross section of a cored wire 1' according to a first embodiment, in which the edges of a sheet forming the outer metal tube 5' do not overlap. The filler layer material 4' is homogeneously filling the space between first tube 3' and outer tube 5'.

FIG. 2B shows a cross section of a cored wire 1'' according to a second embodiment, in which the filler layer 4'' comprises fibers.

FIG. 2C shows a cross section of a cored wire 1''' according to a fourth embodiment, in which the filler layer 4''' comprises several sub-layers.

FIG. 2D shows a cross section of a cored wire 1'''' according to a third embodiment, in which the filler layer 4'''' comprises two different fibrous materials.

FIG. 2E shows a cross section of a cored wire 1''''' according to a fifth embodiment with a preferred outer tube closure, in which the edges of a sheet forming the outer metal tube 5''''' overlap and form a seam portion 7.

Figure 3:
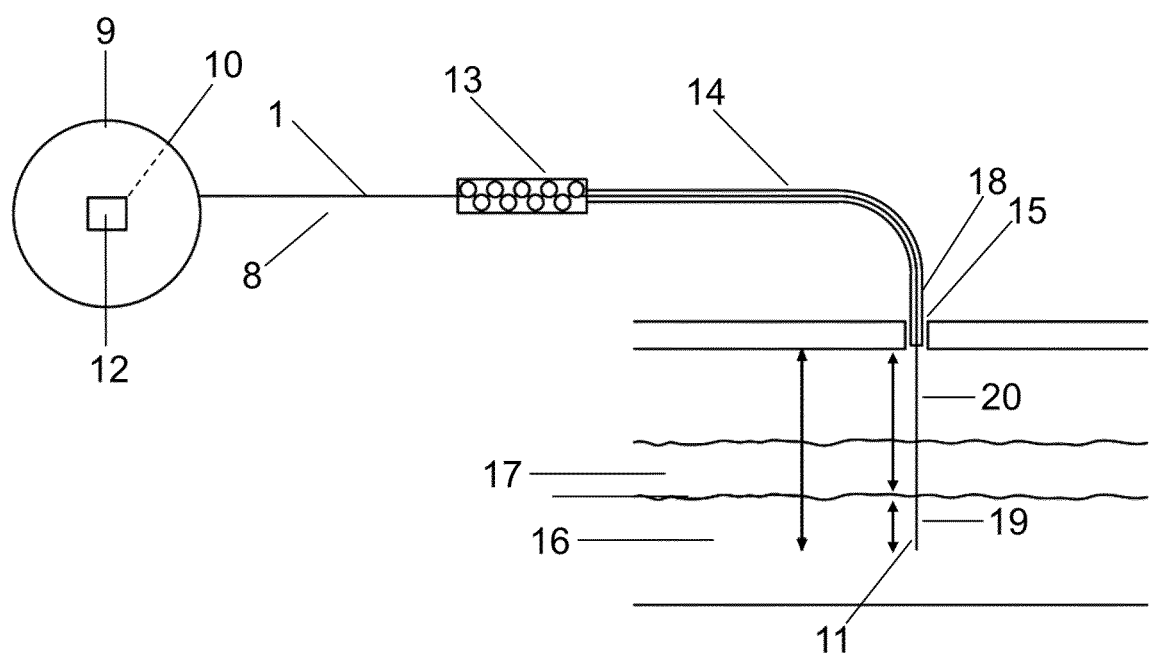
FIG. 3 shows a schematic view of a device embedded in a system for measuring a temperature of a molten metal bath.

FIG. 3 shows a schematic view of a device 8 embedded in a system for measuring a temperature of a molten metal bath. The system comprises the device 8, comprising a cored wire 1 and a pyrometer 12, which is located at least partly on a coil 9 and is at least in part unwound from the coil 9 for conducting a measurement. One end of the device 10 is connected to the pyrometer 12 which in turn could be connected to a computer system (not shown) to process the data obtained with the device 8. The device 8 is fed with the immersion end 11 leading by means of a feeder 13 through a guide tube 14 in a vessel having an entry point 15 and containing the molten metal bath 16. The temperature of a part of the device 8 extending from the coil 9 to the entry point 15 can be considered to be low, which could be a temperature ranging from room temperature up to 100° C. Once passing the entry point 15 in the direction of the molten metal bath 16, a hot atmosphere of up to 1700° C. or even higher is first encountered, followed by a slag layer 17 which is in turn followed by the molten metal bath 16. The entry point 15 to the vessel could be equipped with a blowing lance 18 to prevent metal and slag penetration into the guide tube 14. Subsequently, the cored wire will be fed into the molten metal bath 16 to the required immersion depth where the measurement may be taken.

Up to this point of a measuring sequence, the optical fiber 2 and its leading tip is mechanically protected and thermally insulated by the layers surrounding it. When the leading tip of the device 8 is submerged into the molten metal bath 16 with temperatures up to 1850° C., first the outer tube will melt exposing the filler layer to the molten metal bath 16. A filler layer comprising organic material will start to burn when being subjected to such conditions, exposing the leading tip to the molten metal.

After the measurement sequence the part of the cored wire immersed in the molten metal bath 19 will be molten and thereby consumed.

After the measurement is taken, the part of the device 20 located in the hot atmosphere and extending through the slag layer can be fed back into the direction of the coil 9 and can be reused for the next measurement.

Organic materials are generally suitable as filler layer material since they largely decompose when exposed to a molten metal. When utilized as a filler layer in a cored wire, this burning behavior must be carefully controlled. A degradation further than in the part of the cored wire which is immersed into the molten metal bath in the direction of the opposite end of the cored wire has to be prevented.

A device which has been subjected to such a prolonged decomposition of the filler layer may not be suitable to obtain accurate temperature measurements since the optical fiber with the new leading tip is left unprotected to the harsh environment in a molten metal bath vessel. Tests have shown that the density and structure of the filler layer and the gas permeability of the outer metal tube dominantly influence this unwanted decomposition behavior.

An exemplary construction of a cored wire according to the invention (example 1) comprises a graded index 62.5/125 μm jacket optical fiber embedded in a stainless steel (SS316) tube with a thickness of 0.2 mm and a yield stress of 200 MPa, resulting in a yield force of 238 N. An insulating layer of cotton fibers with a density of 0.5 g/cm$^3$ encloses the first metal tube. This assembly is surrounded by a 0.8 mm thick outer layer of a stainless steel with an outer diameter of 10-16 mm.

In an example according to the prior art (example 2), a cored wire was constructed according to example 1, except for the tube accommodating the optical fiber, which had a thickness of 0.13 mm resulting in a yield force of 94 N.

In a further example according to the prior art (example 3), a cored wire was constructed according to example 1, except for the density of the filler layer, which was 0.2 g/cm$^3$.

To test the measurement performance of the exemplary constructions, the cored wires were connected to a pyrometer and introduced in a molten metal bath in an electric arc furnace. The obtained temperature data was compared to data received with conventional immersion thermocouples.

As shown in table 1, the quality of the obtainable data was improved.

TABLE 1

|  | Example 1 | Example 2 | Example 3 |
|---|---|---|---|
| Yield force first metal tube [N] | 238 | 94 | 238 |
| Density filler layer [g/cm$^3$] | 0.5 | 0.5 | 0.2 |
| Data Quality | +++ | + | + |

Additionally, such improved temperature measurements were obtainable over the total coil length of the cored wire.

LIST OF REFERENCE NUMERALS

1, 1'-1'''' Cored wire
2, 2'-2'''' Optical fiber
1, 3'-3'''' First (inner) metal tube
4, 4'-4'''' Filler layer
5, 5'-5'''' Second (outer) metal tube
6 Vent
7 Outer tube seam
8 Device
9 Coil
10 Opposite end
11 Immersion end
12 Pyrometer
13 Feeder
14 Guide tube
15 Entry point
16 Molten metal bath
17 Slag layer
18 Blowing lance
19 Part of the cored wire immersed in the molten metal bath
20 Part of cored wire subjected to hot atmosphere and slag
T1 Wall thickness of first metal tube
D1 Outer diameter of first metal tube
I1 Inner diameter of first metal tube
CW1 Cross-sectional area of walls of first metal tube
IC1 Inner cross-sectional area of first metal tube
T2 Wall thickness of second metal tube
D2 Outer diameter of second metal tube
I2 Inner diameter of second metal tube
CW2 Cross-sectional area of walls of second metal tube
IC2 Inner cross-sectional area of second metal tube

The invention claimed is:
1. A device for measuring a temperature of a molten metal bath, the device comprising:
 (a) a cored wire having an immersion end and an opposite end, the cored wire comprising:
  (a1) an optical fiber,
  (a2) a first metal tube accommodating the optical fiber,
  (a3) a filler layer surrounding the first metal tube, and
  (a4) a second metal tube accommodating the filler layer, and
 (b) a detector to receive a signal transmitted by the optical fiber, the detector coupled to the opposite end of the cored wire,
 wherein the first metal tube has a yield force of at least 140 Newtons (N), where the yield force is defined as the product of the yield stress of the first metal tube and a cross-sectional area of the first metal tube, the cross-sectional area of the first metal tube being defined by a wall thickness of the first metal tube (CW1) and a total cross-sectional area defined by an outer diameter of the first metal tube (TC1), and the cross-sectional area of the first metal tube defined by the thickness of the walls of the first metal tube (CW1) is less than 45% of the total cross-sectional area defined by the outer diameter of the first metal tube (TC1), and wherein the filler layer has a density in the range of 0.3-1.1 g/cm$^3$ and comprises a filler layer material which is an organic material having an ash content of not more than 10 mass-%.

2. The device of claim 1, wherein the optical fiber is arranged in the center of the cored wire.

3. The device of claim 1, wherein the filler layer comprises at least two filler layer materials.

4. The device of claim 1, wherein the filler layer material is formed from fibers.

5. The device according to of claim 1, wherein the filler layer is formed of at least two sub-layers.

6. The device of claim 1, wherein a ratio of the first tube wall thickness to the first tube outer diameter is less than 15%.

7. The device of claim 1, wherein the second metal tube is gas permeable.

8. The device of claim 1, wherein the cross-section of the optical fiber covers the total cross-sectional area by not more than 4%.

9. The device of claim 1, wherein the first metal tube is concentrically arranged in the second metal tube.

10. The device of claim 1, wherein the linear density of the first metal tube is less than 10% of the linear density of the second metal tube.

11. The device of claim 1, wherein the melting point of the second tube metal is higher than the melting point of the first tube metal.

12. The device of claim 1, wherein the thickness of the filler layer is higher than the wall thickness of the first metal tube.

13. The device of claim 1, wherein the thickness of the filler layer is higher than the wall thickness of the second metal tube.

14. A system comprising a device according to claim 1 and feeding means for feeding a leading tip of the device in a molten metal bath.

15. The device of claim 1, wherein the density of the filler layer is in the range of 0.4-0.8 g/cm$^3$.

16. The device of claim 1, wherein the density of the filler layer is 10 to 50% of a maximum density of the filler layer material.

17. The device of claim 1, wherein the density of the filler layer is 20 to 40% of a maximum density of the filler layer material.

18. The device of claim 11, wherein the melting point of the second tube metal is more than 60° C. higher than the melting point of the first tube metal.

19. The device of claim 1, wherein the second metal tube has an outer diameter in a range of 9 to 14 mm.

20. The device of claim 1, wherein the second metal tube has an inner diameter in a range of 8 to 13 mm.

* * * * *